July 24, 1973 J. P. SCHEIDELL 3,748,094

TOOTHBRUSH STERILIZATION DEVICE

Filed Aug. 12, 1971

United States Patent Office 3,748,094
Patented July 24, 1973

3,748,094
TOOTHBRUSH STERILIZATION DEVICE
John P. Scheidell, Edgewater Park, N.J.
(P.O. Box 246, Beverly, N.J. 08010)
Filed Aug. 12, 1971, Ser. No. 171,204
Int. Cl. A61l 3/00
U.S. Cl. 21—83   5 Claims

ABSTRACT OF THE DISCLOSURE

Apparatus for sterilizing toothbrushes by exposure of the bristle portions thereof to an ultraviolet light source within a shielded chamber of a substantially cylindrical shape with an ultraviolet lamp being centrally disposed in the sterilizing chamber. A rotatable brush holder assembly is adapted to receive a plurality of brushes and upon rotation to a sterilization position present the bristle portions of the brushes to the ultraviolet lamp. The brushes, except when in use, are thus continuously exposed to the germ-killing ultraviolet radiation.

---

The present invention relates generally to sterilization devices utilizing ultraviolet radiation and relates more particularly to a sterilization device of this type for sterilizing and storing a plurality of toothbrushes.

Although concern for oral hygiene is observed to the extent that toothbrushes are widely used on a daily basis, little if any attention is directed to the condition of the brush bristles, either with respect to their apparent physical condition or especially with respect to their germ breeding and carrying condition. Although the continued use of a worn out toothbrush can doubtless have a depreciating effect on the user, all toothbrushes whether in good physical condition or not are potential germ breeders and carriers, and in view of their frequent oral insertion can cause a rapid spread of bacteria and disease. This capability is compounded by the usual exposed storage of a group of brushes in close, frequently touching, proximity in a bathroom, a room more often shared with a group of persons and peculiarly subject to invasions of disease carrying bacteria. Not only are human wastes discharged in this room, but in addition the temperature and humidity of the room are normally above average, contributing to the growth of unwanted germs. During periods of illness of a member of the family, the exposed presence of toothbrushes in such a setting could only be expected to enhance the possibility of germ transfer.

To prevent any chance of germ breeding or transfer from toothbrushes, the present invention provides a device within which a plurality of toothbrushes may be sterilized and stored. The device in brief includes an ultraviolet radiation source which continuously emits radiation of sufficient intensity to kill any micro-organisms present on the brushes during the typical brush storage period. In a preferred embodiment of the invention, the ultraviolet source comprises a centrally disposed lamp around which the brushes are disposed in a radial spaced arrangement by means of a rotatable brush holder. Suitable shielding is provided to prevent the ultraviolet radiation from escaping from the device. The rotation of the brush holder permits an indexing of the individual brushes with an aperture in the housing shielded from the ultraviolet source through which the brushes may be removed from and inserted into the brush holder. The ultraviolet lamp burns continuously, even during brush removal and insertion, but in view of its low energy requirements represents a nominal operating expense.

It is accordingly a first object of the present invention to provide a device for sterilizing toothbrushes.

A further object of the invention is to provide a device as described which in addition to its sterilizing function serves as a drying and storage receptacle for a plurality of toothbrushes.

Another object of the invention is to provide a device as described which may be conveniently mounted in a bathroom and which may be easily used even by small children without danger.

Still another object of the invention is to provide a device as described of a relatively simple, inexpensively fabricated construction and which has relatively low energy requirements.

Additional objects and advantages of the invention will be more readily apparent from the following detailed description of a preferred embodiment thereof when taken together with the accompanying drawings wherein.

Figure 1:
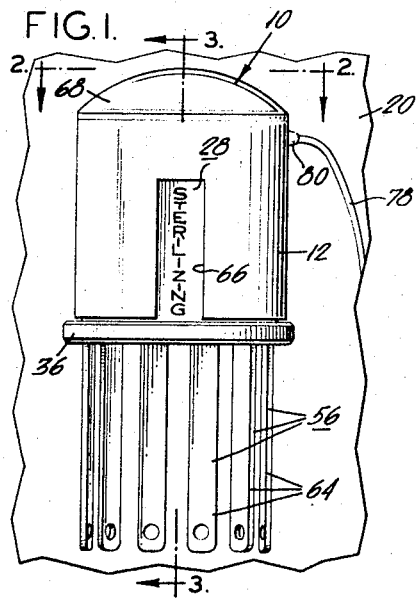
FIG. 1 is a front elevation view of a toothbrush sterilizing device embodying the present invention and shown holding a plurality of toothbrushes undergoing sterilization.

Referring to the drawings, a sterilization device generally designated 10 in accordance with the present invention includes a housing 12 of a generally cylindrical shape and which includes a mounting boss 14 extending exteriorly along one side thereof. The boss 14 includes a tapered internal slot 16 adapted to cooperate with a conventional tapered U-shaped appliance bracket 18 which is attached to a wall 20 by screws 22. The bracket mounting arrangement is as illustrated adapted to removably secure the cylindrical housing 12 to a wall with the axis thereof vertically disposed.

Figure 3:
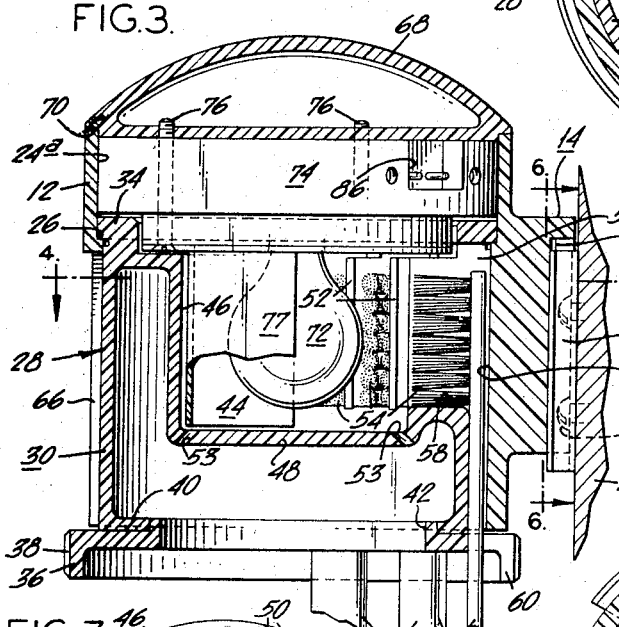
FIG. 3 is an enlarged vertical sectional view taken along line 3—3 of FIG. 1 showing the interior details of the sterilization device.
Figure 6:
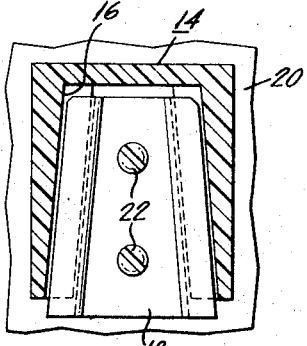
FIG. 6 is a sectional view taken along line 6—6 of FIG. 3 showing details of the mounting bracket.

As shown in FIG. 3, an interior cylindrical surface 24 of the housing 12 is interrupted by an annular shoulder 26 in the upper region of the housing above which a cylindrical housing wall portion 24a of slightly larger diameter extends to the top of the housing.

A brush holder assembly 28 within the housing 12 is characterized by a substantially cylindrical brush holder body 30 having a cylindrical outer wall 32 of a slightly smaller diameter than the wall 24 of the housing to permit sliding relative rotational movement. An annular flange 34 extending outwardly around the upper edge of the brush holder body 30 is adapted to seat on the shoulder 26 of the housing to support the holder in rotatable relation within the housing.

The lower end of the brush holder body 30 extends slightly below the open bottom of the housing 12 and is provided with an indexing ring 36 which is secured to the lower end of the holder body after the holder has been inserted in the housing. As shown most clearly in FIG. 3, the indexing ring 36 extends radially outwardly of the housing and is provided with a serrated outer surface 38 which may be readily grasped to rotate the brush holder assembly with respect to the housing. In the illustrated embodiment, the indexing ring is secured against an inwardly extending flange 40 of the holder body and is characterized by an upwardly extending flange 42 fitted within the flange 40.

Figure 4:
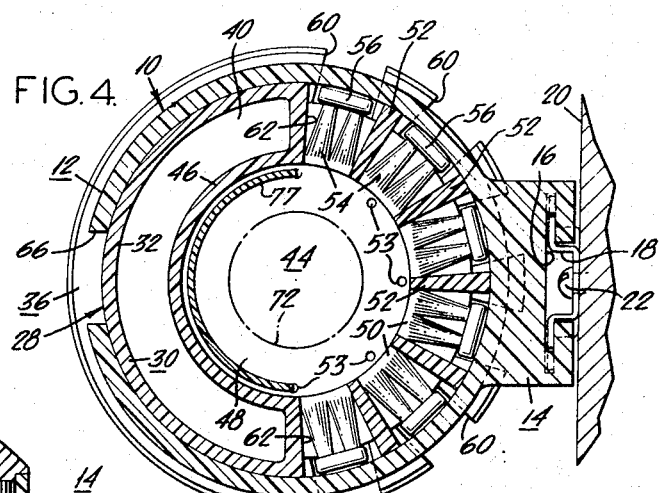
FIG. 4 is a sectional view taken along line 4—4 of FIG. 3.
Figure 7:
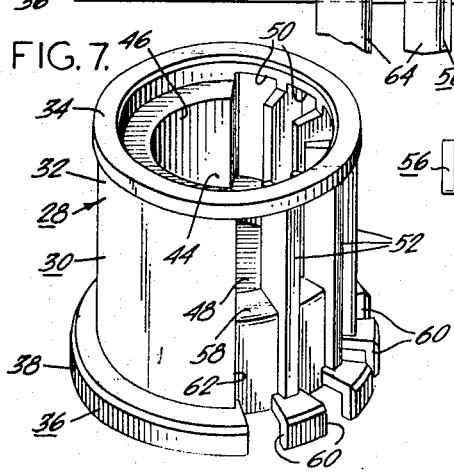
FIG. 7 is a perspective view of the brush holder assembly.
Figure 5:
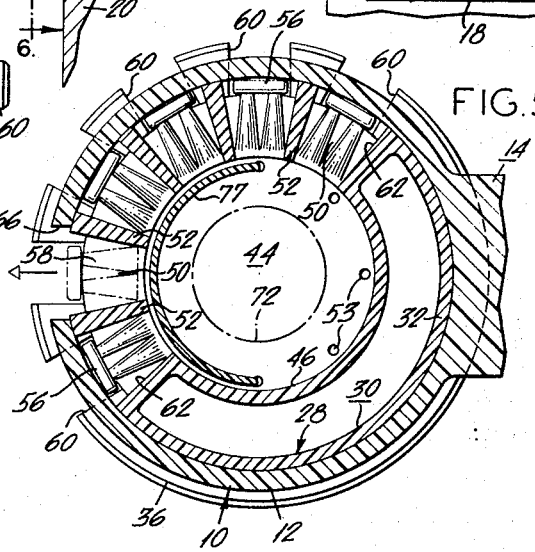
FIG. 5 is a view similar to FIG. 4 but showing the brush holder rotated into a position for removal of one of the brushes from the device.

A sterilizing chamber 44 is formed within the brush holder body 30, in part by an inner cylindrical wall portion 46 and a floor portion 48 thereof. The chamber 44 is not entirely closed, since the solid wall portion 46 extends only about 180° while the remainder of the chamber wall is interrupted by a plurality of spaced apertures 50 set off by vertical dividers 52. Vent holes 53 are provided in floor portion 48 at spaced intervals. The apertures 50 are adapted to receive the bristle portions 54 of toothbrushes 56 as shown in FIGS. 3, 4 and 5, the bottom 58 of the apertures 50 serving to support the bristle portion of the brushes. The indexing ring 36 is slotted at 60 and the holder body surface 32 is grooved at 62 as shown in FIG. 7 to allow the handle portions 64 of the brushes to extend vertically in the manner shown in FIG. 3. To permit the introduction and removal of the brushes from the holder assembly, a slot 66 is provided in the housing 12 of a size sufficient to remove and insert a single brush.

A cover 68 having a spherical outer configuration is characterized by an annular groove 70 adapted to fit within the upper edge of the housing 12. An ultraviolet radiation source is disposed within the sterilizing chamber 44 and is suspended from the cover 68. In the present embodiment, the ultraviolet source comprises an ultraviolet light emitting arc lamp 72 which extends downwardly from the ballast assembly 74 required to provide proper lamp voltage and current. The ballast assembly is secured to the cover 68 by bolts 76 and serves to define the upper surface of the steriliztaion chamber 44. A semi-cylindrical shield 77 extends coaxially downwardly from the ballast assembly in the forward portion of the sterilization chamber to shield the housing aperture 66 from the radiation source. The shield 77 extends below the bottom 58 of the brush apertures 50.

Figure 2:
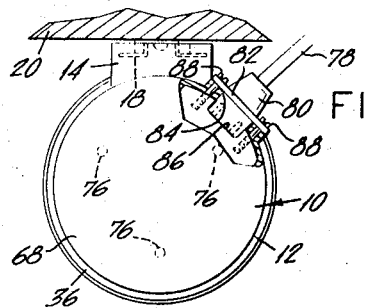
FIG. 2 is a plan view taken along line 2—2 of FIG. 1 and partly broken away to show details of the power cord connection.

To prevent the lifting of the cover 68 from the housing while the ultraviolet lamp is lighted, the power cord 78 is as illustrated in FIG. 2, provided with a screw connection passing through the housing. A female plug 80 on cord 78 attached to a plate 82 is adapted to extend through an aperture 84 in the housing into a male socket 86 in the ballast assembly 74. Screws 88 passing through the plate 72 secure the plug 80 in place in the socket and prevent the removal of the cover, ballast assembly and bulb prior to the removal of the screw 88 and power cord plug.

For operation of the device, the housing is mounted on a wall by means of the mounting bracket illustrated and the power cord 78 is connected with a source of electric power. The ultraviolet lamp 72 will then remain continuously lit, bathing the sterilization chamber 44 with germ-killing ultraviolet radiation. To load a toothbrush into the holder, the indexing ring 36 is rotated into a position such as shown in FIG. 5 wherein one of the brush apertures 50 is aligned with the housing aperture 66. A brush is then inserted into the holder with the bristles facing inwardly and extending into the aperture 50 with the handle portion 64 in the groove 62 of the holder body. The indexing ring is then rotated to turn the brush holder assembly into the brush sterilizing position illustrated in FIGS. 1, 3 and 4. Suitable indicia such as the word "sterilizing" as shown in FIG. 1 may be provided on the cylindrical surface 32 of the brush holder body 30 which will align with the aperture 66 when all of the brush apertures 50 are presented to the sterilization chamber. Additional brushes may be added to the brush holder in a similar manner simply by turning the indexing ring until an empty brush aperture appears through the housing aperture 66. The brushes are stored in the sterilizing position shown in FIGS. 1, 3 and 4 and are continuously subject to the ultraviolet radiation which should be of a sufficient intensity to kill all micro-organisms on the brush bristles.

For removal of a given brush, the indexing ring is simply rotated until the brush may be fully seen in the housing aperture 66, whereupon the brush is removed as shown in FIG. 5. The brush holder assembly may be left in this position during use of the toothbrush which normally requires only a few moments time so that the brush may then be quickly replaced in the empty brush aperture and the indexing ring returned to the sterilizing position. Although other brushes in the device may not be presented to the ultraviolet source during this interval, the time for brush usage is so short relative to the time available for sterilization that the interruption is insignificant.

A polished surface on the interior of the shield 77 may be provided to reflect the ultraviolet radiation toward the brush bristles presented at the opposite side of the sterilization chamber. The shield 77 effectively prevents any emission of radiation from the housing through the aperture 66, especially in view of its downward extent below the bottom 58 of the apertures 50. The vent holes 53 in the floor 48 permit moisture from the bristles and ozone generated by the lamp to escape from the sterilization chamber. The holes are preferably inclined as illustrated so that the ultraviolet radiation will not be directed downwardly through the central aperture in the indexing ring.

The device is preferably made of a light-weight, unbreadable plastic material although other suitable materials may obviously be substituted. Care should be taken in selecting the plastic materials subject to the ultraviolet radiation since certain types of plastic can deteriorate under extended ultraviolet exposure.

While the bracket arrangement illustrated in the preferred embodiment provides a simple means of mounting the device on a wall, it will be obvious that many other suitable mounting arrangements could be employed.

The ultraviolet lamp and ballast preferred for the device are made and sold by the General Electric Company Lamp Division, the lamp being a four watt, low pressure mercury arc lamp Catalogue #G4S11 characterized by a radiation output primarily in the far ultraviolet wave lengths. The ballast recommended for such a lamp is the General Electric Inductive Ballast, Catalogue #89G504. Although the bulb described has a life of approximately 6,000 hours, replacement will occasionally be necessary and it is accordingly desirable to have some means provided to determine whether or not the bulb is functioning properly. Since a small fraction of the present bulb's radiation output appears as bluish light, a soft glow will be reflectively emitted from the bottom of the unit through the vent holes which in a darkened room will provide an indication that the unit is properly functioning. Should the lamp require replacement, the cover is simply lifted from the housing after the power cord has been removed in the manner described.

Manifestly, changes in details of construction can be effected by those skilled in the art without departing from the spirit and the scope of the invention.

I claim:

1. Apparatus for sterilizing and storing toothbrushes and the like comprising a cylindrical hollow housing, a cylindrical brush holder assembly disposed for rotation within said housing, means defining a sterilization chamber within said brush holder assembly, a source of ultraviolet radiation disposed within said sterilization chamber adapted to continuously emit germ-killing radiation within said chamber, a plurality of apertures in said brush holder assembly each adapted to receive the bristle portion of a toothbrush disposed therewithin, an aperture in said housing permitting the introduction and withdrawal of a toothbrush into and from each of said brush holder apertures, means for rotating said brush holder assembly to selectively align said assembly apertures with said housing aperture and to rotate said assembly to a sterilizing position wherein all of said assembly apertures are positioned so as to communicate with said sterilizing chamber to present the brushes disposed therein to the ultraviolet radiation, and means for shielding said source of ultraviolet radiation to prevent the passage of ultraviolet radiation from said housing.

2. The invention as claimed in claim 1 wherein said shielding means comprises a shield disposed in said sterilization chamber opposite said housing aperture and adapted to cover said assembly apertures to prevent passage of ultraviolet radiation from said housing during the insertion and withdrawal of brushes from the apparatus.

3. The invention as claimed in claim 1 wherein said means for rotating said brush holder assembly comprises an indexing ring on said brush holder assembly extending radially outwardly beyond said housing from below the lower edge of said housing.

4. The invention as claimed in claim 1 including indicating means for indicating the sterilizing position of said brush holder assembly.

5. The invention as claimed in claim 1 wherein said source of ultraviolet radiation comprises a mercury arc lamp axially disposed within said housing.

References Cited
UNITED STATES PATENTS

| | | | |
|---|---|---|---|
| 2,447,183 | 8/1948 | Irish et al. | 21—83 |
| 2,592,131 | 4/1952 | Farrar | 21—DIG. 2 |
| 3,114,038 | 12/1963 | Meader | 21—102 UX |
| 3,309,159 | 3/1967 | Le Sueur et al. | 21—102 R |
| 2,129,150 | 9/1938 | Pekrol | 312—97.1 UX |
| 1,952,686 | 3/1934 | Sakier | 312—206 |
| 3,141,712 | 7/1964 | Holmes et al. | 312—206 |
| 2,579,242 | 12/1951 | Pask | 312—206 X |

MORRIS O. WOLK, Primary Examiner

D. G. MILLMAN, Assistant Examiner

U.S. Cl. X.R.

21—102 R, 105, DIG. 2; 312—97.1, 206, 305